(12) United States Patent
Shian et al.

(10) Patent No.: US 11,086,121 B2
(45) Date of Patent: Aug. 10, 2021

(54) DISPLAY TECHNIQUES INCORPORATING FLUIDIC ACTUATORS AND RELATED SYSTEMS AND METHODS

(71) Applicant: SOLCHROMA TECHNOLOGIES, INC, Somerville, MA (US)

(72) Inventors: Samuel Shian, Arlington, MA (US); Roger Diebold, Somerville, MA (US)

(73) Assignee: SOLCHROMA TECHNOLOGIES, INC., Somerville, MA (US)

( * ) Notice: Subject to any disclaimer, the term of this patent is extended or adjusted under 35 U.S.C. 154(b) by 0 days.

(21) Appl. No.: 17/046,904

(22) PCT Filed: Oct. 25, 2019

(86) PCT No.: PCT/US2019/058196
§ 371 (c)(1),
(2) Date: Oct. 12, 2020

(87) PCT Pub. No.: WO2020/087028
PCT Pub. Date: Apr. 30, 2020

(65) Prior Publication Data
US 2021/0157123 A1     May 27, 2021

Related U.S. Application Data

(60) Provisional application No. 62/751,412, filed on Oct. 26, 2018.

(51) Int. Cl.
*G02B 26/00*     (2006.01)
*H02N 1/00*      (2006.01)
*G09G 3/34*      (2006.01)

(52) U.S. Cl.
CPC ........... *G02B 26/004* (2013.01); *G09G 3/344* (2013.01); *G09G 2354/00* (2013.01); *H02N 1/002* (2013.01)

(58) Field of Classification Search
CPC .. G02B 26/004; G09G 2354/00; G09G 3/344; H02N 1/002
See application file for complete search history.

(56) References Cited

U.S. PATENT DOCUMENTS 9,703,019 B2 *  7/2017  Shian ................. G02B 3/14
2009/0279158 A1 * 11/2009 Peeters .............. G09G 3/348
                                                       359/228
2014/0355101 A1   12/2014 Shian

OTHER PUBLICATIONS

International Search Report for PCT/US2019/058196 dated Jan. 23, 2020.

(Continued)

*Primary Examiner* — Tuyen Tra
(74) *Attorney, Agent, or Firm* — Innovators Legal

(57) ABSTRACT

Display devices and actuators and other components for a display device are provided. Display devices are provided configured to alter an optical property by moving an amount of a first fluid through which light can pass. In some aspects, the first fluid is movable within a cavity by varying an amount of pressure on the cavity; and the display includes a means of varying the amount of pressure. The means can include an actuator. An actuator is provided that has a first cavity containing fluid and bounded at least in part by a first elastomer; a second cavity containing fluid and bounded at least in by part by a second elastomer; a channel connecting the first cavity to the second cavity; and a valve configured to be electrically operated into an open state or a closed state and thereby allow or block flow of the fluid through the channel.

25 Claims, 14 Drawing Sheets

(56) References Cited

OTHER PUBLICATIONS

International Preliminary Report on Patentability for PCT/US2019/058196 dated Oct. 8, 2020.

* cited by examiner

DISPLAY TECHNIQUES INCORPORATING FLUIDIC ACTUATORS AND RELATED SYSTEMS AND METHODS

CROSS-REFERENCE TO RELATED APPLICATIONS

This application is the 35 U.S.C. § 371 national stage application of PCT Application No. PCT/US2019/058196, filed Oct. 25, 2019, where the PCT claims priority to, and the benefit of, U.S. provisional application entitled "DISPLAY TECHNIQUES INCORPORATING FLUIDIC ACTUATORS AND RELATED SYSTEMS AND METHODS" having Ser. No. 62/751,415, filed Oct. 26, 2018, both of which are herein incorporated by reference in their entireties.

STATEMENT REGARDING FEDERALLY SPONSORED RESEARCH OR DEVELOPMENT

This invention was made with government support under Grant No. 1660204 awarded by the National Science Foundation. The government has certain rights in the invention.

TECHNICAL FIELD

The present disclosure generally relates to displays and methods of making and uses thereof.

BACKGROUND

Displays, such as emissive LED displays, can consume a substantial amount of electrical power when the display is active. Large area displays such as billboards and other digital signs, can consume an amount of electrical power equivalent to that consumed by multiple average-size households during peak hours. This high-power consumption results not only in high operating costs but also additional challenges associated with high power demands.

For instance, a reliable power source is often necessary for proper and continuous operation of a display, which can limit deployment of high-power consumption displays to locations where such power sources are available. Furthermore, high power consumption typically generates a substantial amount of heat, and active cooling can be required to maintain the health of the display and its electronics. Active cooling can in turn lead to additional cost, power consumption, and maintenance.

There remains a need for improved display technologies that overcome the aforementioned deficiencies.

SUMMARY

In various aspects, display devices and components thereof are provided that overcome one or more of the aforementioned deficiencies.

In an exemplary aspect, a display device is provided that is configured to alter an optical property by moving an amount of a first fluid through which external light can pass, the display device including a fluidic display unit having at least a first cavity containing a first fluid, the first fluid movable within the first cavity by varying an amount of pressure on the first cavity; and a fluidic actuator mechanically coupled to the fluid-filled cavity of the fluidic display unit, the fluidic actuator having a second fluid, wherein the fluidic actuator is configured to be electrically actuated to vary the amount of pressure on the first cavity of the fluidic display unit, wherein varying the pressure causes movement of the first fluid within the fluidic display unit, thereby altering the optical property of the display.

In various aspects, display devices are provided that have as a component an actuator. In an exemplary aspects, the actuator has a first cavity containing fluid and bounded at least in part by a first elastomer; a second cavity containing fluid and bounded at least in by part by a second elastomer; a channel connecting the first cavity to the second cavity and through which fluid can flow; and a valve configured to be electrically operated into an open state or a closed state and thereby allow or block flow of the fluid through the channel, respectively, wherein maintaining the valve in the closed state requires less electrical power than maintaining the valve in the open state.

In an exemplary aspect, a display device is provided that is configured to alter an optical property by moving an amount of a first fluid through which external light can pass, the display device comprising: a fluidic display unit comprising at least a first cavity comprising a first fluid, the first fluid movable within the first cavity by varying an amount of pressure on the first cavity; and a means of electrically varying the amount of pressure on the first cavity of the fluidic display unit, wherein varying the pressure causes movement of the first fluid within the fluidic display unit, thereby altering the optical property of the display.

Other systems, methods, features, and advantages of display devices, actuators, and other components thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various aspects, described below, when taken in conjunction with the accompanying drawings.

DETAILED DESCRIPTION

Figure 1:
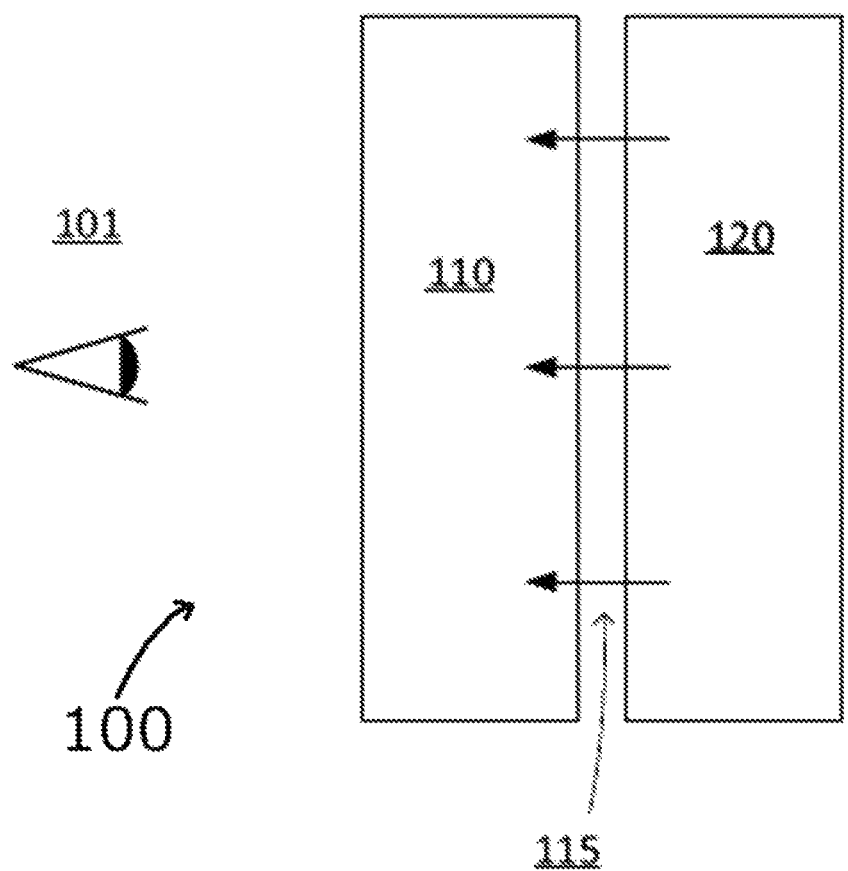
FIG. 1 is a block diagram of an illustrative display device comprising a fluidic actuator, according to some aspects.

Some reflective display technologies utilize a colored fluid, such as an ink, which is configured to be moved between a reflector and a viewer of the display. By moving fluid around within the display device, an amount of color between the viewer and the reflector can be changed, thereby changing an amount of color visible to the viewer. Such displays typically require energy to maintain the fluid in a particular state, however.

For instance, some fluidic devices move fluid between cavities through channels or flow paths using an external energy source that moves the fluid from a low energy state to a high energy state. If the energy source is removed, however, the fluid will return to its low energy state. Conventional mechanisms to stop fluid flow such as check valves cannot generally be used to mitigate this issue because it is necessary to allow fluid to flow reversibly along the same channel or flow path.

In addition, it can be desirable to operate a fluidic display device under high pressure so that the results of moving the fluid around are visible on the display with low latency. There can also be challenges, however, in operating reflective display devices, such as those containing colored ink, under such high pressure. For instance, high pressure fluids can leak if the cavity walls are not suitably thick, yet since in a reflective display the light must pass through these walls, the display quality can be degraded by thick, and therefore likely more refractive, material.

In various aspects, display technologies and methods of making and uses thereof are provided. In some aspects, the display technologies can overcome one or more of the aforementioned deficiencies. In these various aspects, display technologies are provided based on fluidic actuators. In some aspects, passive displays are provided that overcome one or more of the aforementioned deficiencies. Passive displays, also called reflective displays, can use external ambient light as a light source and therefore can be capable of utilizing less power compared to the internal bulbs or LEDs of emissive displays. In some aspects, multistable displays are provided arranged so that one or more pixels can maintain a state without being actively controlled, which allows the pixels to consume little or no power while maintaining that state. Passive, multistable displays therefore represent an advantageous type of low-power display in which no internal light source is necessary and the primary use of power is in writing new information to a pixel of the display.

This disclosure provides techniques for producing a fluidic actuator in which fluid can be moved then maintained in a desired arrangement. The actuator can produce a pressure at a surface of the actuator that is capable of being adjusted and, once adjusted to a desired amount, held at that pressure using little to no power. By mechanically coupling a fluidic display unit to such a surface, the actuator can be operated to push against a surface of the fluidic display unit with a varying amount of pressure, thereby providing a level of control over the location of fluid within the fluidic display unit.

Before the present disclosure is described in greater detail, it is to be understood that this disclosure is not limited to particular aspects described, and as such may, of course, vary. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Although any methods and materials similar or equivalent to those described herein can also be used in the practice or testing of the present disclosure, the preferred methods and materials are now described. Functions or constructions well-known in the art may not be described in detail for brevity and/or clarity. Aspects of the present disclosure will employ, unless otherwise indicated, techniques of mechanical engineering, electrical engineering, computer science, physics, chemistry, chemical engineering, and the like, which are within the skill of the art. Such techniques are explained fully in the literature.

Although the disclosure will describe several aspects of the reflective display technologies, it is to be appreciated that various alterations, modifications, and improvements will readily occur to those skilled in the art. Such alterations, modifications, and improvements are intended to be within the spirit and scope of the disclosure. Various features of the present reflective display technologies can be used alone, in combination, or in a variety of arrangements not specifically discussed in the aspects described herein. For example, features described in one aspect can be combined in any manner with features described in other aspects. Further, though advantages of the reflective display technologies are indicated, it should be appreciated that not every aspect of the technology described herein will include every described advantage. Some aspects may not implement any features described as advantageous herein and in some instances one or more of the described features may be implemented to achieve further aspects. Accordingly, the description and drawings are by way of example only.

Also, the disclosure also embodies a method, of which an example has been provided. The acts performed as part of the method can be ordered in any suitable way. Accordingly, aspects can be constructed in which acts are performed in an order different than illustrated, which can include performing some acts simultaneously, even though shown as sequential acts in illustrative aspects.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some aspects, the term "about" can include traditional rounding according to significant figures of the numerical value. In addition, the phrase "about 'x' to 'y'", where 'x' and 'y' are numerical values, includes "about 'x' to about 'y'".

In some instances, units may be used herein that are non-metric or non-SI units. Such units may be, for instance, in U.S. Customary Measures, e.g., as set forth by the National Institute of Standards and Technology, Department of Commerce, United States of America in publications such as NIST HB 44, NIST HB 133, NIST SP 811, NIST SP 1038, NBS Miscellaneous Publication 214, and the like. The units in U.S. Customary Measures are understood to include equivalent dimensions in metric and other units (e.g., a dimension disclosed as "1 inch" is intended to mean an equivalent dimension of "2.5 cm"; a unit disclosed as "1 pcf" is intended to mean an equivalent dimension of 0.157 $kN/m^3$; or a unit disclosed 100° F. is intended to mean an equivalent dimension of 37.8° C.; and the like) as understood by a person of ordinary skill in the art.

The articles "a" and "an," as used herein, mean one or more when applied to any feature in aspects of the present disclosure and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Further, some actions are described as taken by a "user." It should be appreciated that a "user" need not be a single individual, and that in some aspects, actions attributable to a "user" can be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Display Technologies, Displays, and Methods of Use Thereof

Passive, multistable displays based on microfluidic actuators present a unique solution to the above-described challenges. Passive displays, also called reflective displays, use external ambient light as a light source and therefore can utilize less power compared to the internal bulbs or LEDs of emissive displays. Additionally some multistable displays are arranged so that a pixel can maintain its state without being actively controlled, which allows the pixel to consume little or no power while it maintains the state. Passive, multistable displays therefore represent a potentially advantageous type of low-power display in which no internal light source is necessary and the primary use of power is in writing new information to a pixel of the display.

The applicants have recognized and appreciated techniques for producing a fluidic actuator in which fluid can be moved then maintained in a desired arrangement. The actuator can produce a pressure at a surface of the actuator that can be adjusted and, once adjusted to a desired amount, held at that pressure using little to no power. By mechanically coupling a fluidic display unit to such a surface, the actuator can be operated to push against a surface of the fluidic display unit with a varying amount of pressure, thereby providing a level of control over the movement and location of fluid within the fluidic display unit.

Following below are more detailed descriptions of various concepts related to, and aspects of, techniques for producing a fluidic actuator. It should be appreciated that various aspects described herein can be implemented in any of numerous ways. Examples of specific implementations are provided herein for illustrative purposes only. In addition, the various features described in the aspects below may be used alone or in any combination, and are not limited to the combinations explicitly described herein.

FIG. 1 is a block diagram of an illustrative display device comprising a fluidic actuator, according to some aspects. In the example of FIG. 1, display device 100 includes a fluidic display unit 110 and a fluidic actuator 120 arranged and configured to apply a variable force 115 to the fluidic display unit 110. The display device is configured to be viewed from the perspective of a viewer 101.

As referred to herein, a "fluidic" element, such as a display unit or actuator, refers to an element that includes a fluid and whose function depends, at least in part, on the position and/or movement of said fluid. In some cases, a fluidic element can be filled with fluid, although it is not a requirement that an element be completely filled with fluid to be considered a "fluidic" element.

In the example of FIG. 1, fluidic display unit 110 can include any display unit containing fluid that is configured to alter one or more optical properties of the display unit by moving the fluid within the display unit. The display unit 110 can represent any suitable unit of a display, such as but not limited to a pixel, a sub-pixel, or a plurality of pixels. Illustrative examples of optical properties that can be altered by movement of fluid within the fluidic display unit 110 include apparent color, brightness, specularity, or any other alteration in the nature and/or type of electromagnetic radiation that can be emitted and/or reflected by the display unit.

According to some aspects, an optical property that can be altered by movement of fluid within the fluidic display unit 110 can include alterations to changes in the color of light reflected from the display unit. As one example, such alterations can include alterations to changes in color produced when white light reflects from the display unit. That is, by arranging fluid within display unit 110 in a first manner, it can be that white light reflecting from the display unit 110 is emitted with a first non-white color (e.g., blue), and by arranging fluid within the display unit in a second manner, it can be that white light reflecting from the display unit is instead emitted with a second non-white color (e.g., red). In some aspects, fluidic display unit 110 can include inks, pigments and/or other color agents that can be arranged within the fluidic display unit to alter how the color of reflected light is affected by such reflection.

According to some aspects, an optical property that can be altered by movement of fluid within the fluidic display unit 110 can include alterations in the manner in which non-visible electromagnetic radiation, such as x-rays, radio waves, microwaves, infrared, etc. is emitted and/or reflected from the display unit.

According to some aspects, fluidic display unit 110 can include a plurality of cavities containing a fluid, and the variable force 115 applied by the fluidic actuator 120 can cause fluid to flow between the cavities. When the variable force 115 is maintained at a fixed, or substantially fixed, magnitude, net fluid flow within the fluidic display unit 110 can eventually cease as the fluid in the display unit reaches an equilibrium state. The fluidic display unit 110 can be arranged such that an amount of fluid in one or more of the cavities is determinative of at least one optical property of the fluidic display unit, such that increasing or decreasing the amount of fluid in the one or more cavities can cause an alteration in said at least one optical property.

In some aspects, fluidic display unit 110 can include one or more reflectors such that electromagnetic radiation can pass through at least a portion of the fluidic display unit, be reflected from the reflector, and be output from the display unit in a viewing direction. In cases where the fluidic display unit 110 includes a plurality of cavities containing a fluid, the reflector can, in some aspects, be arranged so that the electromagnetic radiation passes through some, but not all, of the cavities. Thus, changing the arrangement of fluid within the cavities can cause alterations to one or more optical properties of the radiation when reflected by the display unit. The reflector can be configured to reflect any wavelength or wavelengths of radiation as desired; for example, where the display unit is configured to alter optical properties of visible light, the reflector can be configured to reflect visible light. In some cases, the reflector can be configured to reflect non-visible light, either exclusively or in addition to visible light. According to some aspects, a reflector can include one or more of paper (e.g., white paper), Teflon, white painted surfaces, titanium oxide particles, barium sulfate coatings, silver mirrors, indium tin oxide coatings, or combinations thereof.

As discussed above, in the example of FIG. 1, fluidic actuator 120 is arranged and configured to apply a variable force 115 to the fluidic display unit 110. In some aspects, the fluidic actuator 120 is configured to apply a mechanical force to the fluidic display unit. The variable force 115 can be applied directly from the fluidic actuator 120 to the fluidic display unit 110 (e.g., the actuator can be in physical contact with the display unit) and/or can be applied via intermediate mechanical elements.

According to some aspects, fluidic actuator 120 can include one or more membranes comprising an electroactive polymer, which can be actuated by an electric field. For example, dielectric elastomers produce large strains by sandwiching a passive elastomer film between two electrodes. By applying a voltage to the electrodes, a very large strain (e.g., up to 300%) can be generated in the elastomer film. When a dielectric elastomer is fixed at one or more places, this strain can cause the film to change in shape and/or length. Consequently, the pressure of a fluid arranged within a cavity bounded by a dielectric elastomer can be altered by actuation of the elastomer. According to some aspects, suitable electroactive polymers can include, but are not limited to, polyacrylate elastomer, natural rubber, silicone rubber, chloroprene rubber, butyl rubber, isoprene rubber, nitrile rubber, ethylene propylene diene monomer (EPDM), acrylonitrile butadiene styrene (ABS), fluorosilicone, thermoplastic elastomer, poly(urethane) rubber, elastomer copolymers, composites of the aforementioned polymers with at least one kind of inorganic filler, or combinations thereof, including more than one interpenetrating polymer network.

According to some aspects, fluidic actuator 120 can include one or more valves configured to be electrically operated into a plurality of states, which include at least an open state and a closed state. As referred to herein, a closed state of a valve refers to a state in which fluid flow is blocked by the valve, such that either no fluid flows through the valve, or at least that a sufficiently small amount of fluid flows through the valve that the valve can maintain fluid pressure on either side of the valve for a desired amount of time. An open state of a valve, in contrast, refers to a state in which fluid can flow through the valve, although in some cases a valve can be configured to be operated into multiple different open states that allow fluid flow through the valve to different extents. In some aspects, operating a valve into a closed state can require less power than operating the valve into any open states. This configuration can be produced in various ways, including through the application of fluid pressure to maintain the closed state in the absence of electrical actuation. Examples of such approaches are discussed further below.

According to some aspects, fluidic actuator 120 can include one or more valves in addition to one or more membranes comprising an electroactive polymer. Such an actuator can be operated to move fluid around within the actuator by actuating the electroactive polymer as described above while the valve is in an open state, then closing the valve to maintain the fluid in desired locations. In some cases, the fluid can be maintained in desired locations even when the electroactive polymer is relaxed because, although there can be a net fluid pressure against the valve from one side of the valve, the valve is in a closed state and thereby is able to maintain this net pressure for a desired amount of time (which, in some cases, is because no fluid flows through the valve).

According to some aspects, fluidic actuator 120 can be arranged to have a higher fluid pressure than the fluidic display unit 110. In some aspects, fluidic actuator 120 include one or more hydraulic fluids, such as aqueous salt solutions, glycerin, glycols, polyols, silicone oils, vegetable oils, mineral oils, motor oils, lubricating oils, polyalphaolefins, ionic liquids, hydrofluoroethers, fluoroketones, silicate esters, synthetic oils, and/or fluorinated hydrocarbons.

Figure 2:
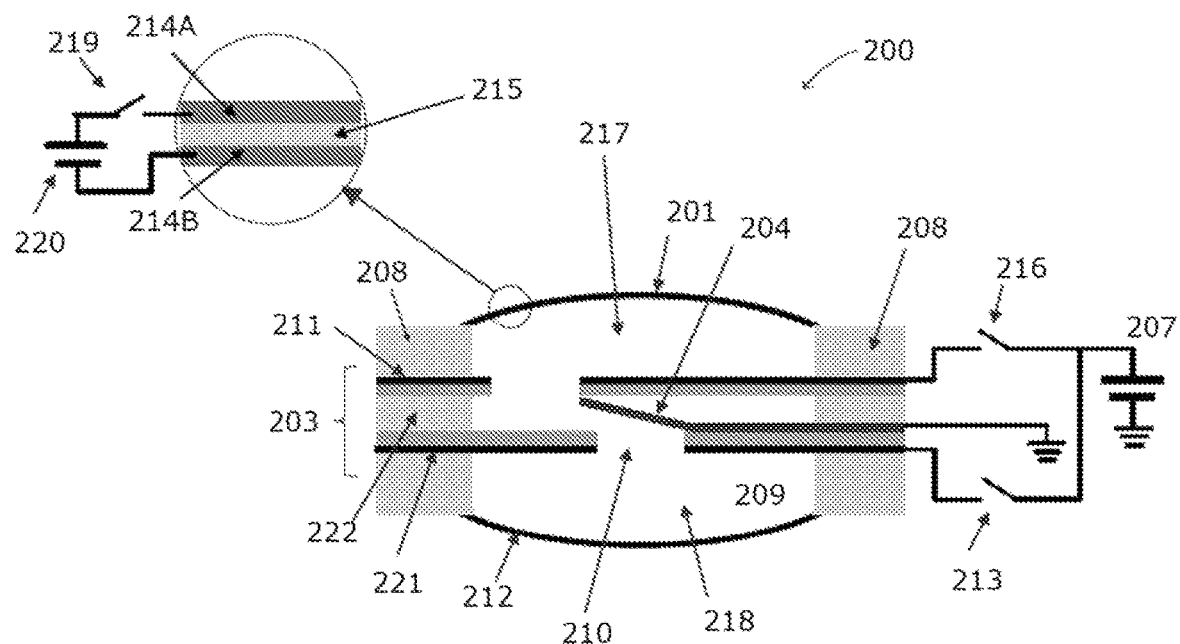
FIG. 2 is a cross-sectional schematic of an illustrative fluidic actuator, according to some aspects.

FIG. 2 is a cross-sectional schematic of an illustrative fluidic actuator, according to some aspects. Fluidic actuator 200 is provided as one possible implementation of fluidic actuator 120 shown in FIG. 1 and discussed above. In the example of FIG. 2, fluidic actuator 200 includes active membrane 201 and passive membrane 212 which are coupled to a frame 208. Fluidic actuator 200 can be controlled to produce varying amounts of pressure at the membrane 201 as discussed below. As such, the actuator 200 can apply a variable force to an element, such as a fluidic display unit, that is mechanically coupled to the membrane 201.

In the example of FIG. 2, the interior of the actuator, bounded by the membranes 201 and 212 and the frame 208, includes a fluid 209. A valve 203, which includes flap 204, controls whether fluid 209 can flow between the upper cavity 217 and the lower cavity 218. Support 208 can include a relatively stiff material such as polyacrylate, acrylonitrile butadiene styrene (ABS), polyethylene terephthalate (PET), high-density polyethylene (HDPE), Kapton, epoxy, nylon, polyvinyl chloride (PVC), polypropylene (PP), polycarbonate, fiberglass composites, and/or carbon composites. Moreover, support 208 can be a separate part or a part of a multilayer component. In some aspects, fluid 209 can be a non-compressible fluid, such as an aqueous salt solution, glycerin, glycols, polyols, silicone oils, vegetable oils, mineral oils, motor oils, lubricating oils, polyalphaolefins, ionic liquids, hydrofluoroethers, fluoroketones, silicate esters, synthetic oils, fluorinated hydrocarbons, or combinations thereof.

In the example of FIG. 2, the valve 203 includes layers 211 and 221, a spacer layer 222, and a flap 204. In some aspects, the layers 211 and 221 can include apertures which allow fluid to flow between the cavities 217 and 218. For instance, the layers 211 and 221 can be patterned with channels to form apertures allowing said fluid flow. In some aspects, layers 211 and 221 can include a stiff material such as PET, polyester, glycol modified polyester, mylar, polyamide, polyimide, phenolic, polypropylene, polyacrylate or combinations thereof.

In the example of FIG. 2, layers 211 and 221 are laminated with an electrically conductive material electrically coupled to switch 213 and switch 216, respectively, which are in turn coupled to a power source 207 (e.g., a battery, a high-voltage DC-DC converter, a high voltage AC-DC converter, or a rectified transformer). These layers of electrically conductive material, referred to henceforth as electrode layers, can be configured for electrostatic actuation with respect to flap 204. In particular, by opening and closing the switches 213 and 216, differences in electric potential between the flap 204, which is coupled to ground, and the layers 211 and/or 221 can be produced. The flap can include a conductive polymer, or a laminate of a polymer and/or a conductive layer, and thereby be attracted to an adjacent layer 211 or 221 when such a potential difference exists. As a result, the flap can be opened and closed with respect to aperture 210 by activation of the switches 213 and 216. In some aspects, the flap 204 can include a conductive polymer which can include, but is not limited to, doped polyaniline or rigid-rod conductive polymers, filled rubbers such as silicone rubber, polyurethane rubber, acrylic rubber containing one or more of the following fillers: carbon black, metal-coated carbon, carbon nanotubes, and/or graphene, or combinations thereof. In some aspects, flap 204 can include a laminate of dielectric polymers having an electrically-conductive layer, such as, but not limited to, mylar or polypropylene coated with aluminum, silicone rubber coated with an electrically conductive silicone elastomer composite, polyaniline coated polyethylene, and/or graphene coated polypropylene.

As an example of the aforementioned opening and closing of the flap 204, when switch 216 is turned on and switch 213 is off, electrostatic attraction between flap 204 and the electrode in layer 211 can drive the flap toward layer 211, opening aperture 210 and allowing fluid to flow through. However, when switch 213 is turned on and switch 216 is off, electrostatic attraction between flap 204 and the electrode in layer 221 can drive the flap toward layer 221, eventually contacting the layer and forming a seal around the perimeter of flap 204 and closing aperture 210.

In the example of FIG. 2, membranes 201 and 212 work as counter-acting springs with fluid 209 as a force or displacement transfer medium. Membrane 201 includes a dielectric elastomer, which in turn includes dielectric 215 sandwiched between electrodes 214A and 214B. By applying electrical charges to electrodes 214A and 214B, e.g., by closing switch 219 and thereby connecting power source 220, the electrodes are electrostatically attracted to one another, causing the membrane 201 to expand laterally. Since the membrane 201 is fixed at boundaries, this causes the membrane to deform outwards and the pressure in cavity 216 lowers. When this occurs, if the aperture 210 is open, and pressure in cavity 218 is higher than that in cavity 217, fluid 209 will flow from cavity 218 to cavity 217. Subsequently, when the switch 219 is opened, the membrane 201 will contract inwards and the pressure in cavity 217 will increase. This can drive the flow of fluid 209 from cavity 217 to cavity 218. In this manner, opening and closing of the switch 219 can cause fluid to flow between the cavities 217 and 218.

If the switch 219 is closed and fluid flows from cavity 218 to 217, then subsequently the valve 203 is closed by closing switch 213, when switch 219 is opened again, the higher pressure of the fluid in cavity 217 will be unable to flow back to cavity 218. Further, because the direction of flap 204 and the higher pressure in cavity 217 relative to cavity 218, the flap could be maintained at closed position when switch 219 is turned off because the fluid pressure acts to push the flap into a closed position. In this fashion, the actuation state can be maintained without supplying power for either active membrane 201 or valve 203. Furthermore, by controlling an amount of fluid that is caused to flow into cavity 217 from cavity 218 prior to closing of the valve 203, the pressure at membrane 201 can be controlled and held without supplying power to either the valve of the membrane 201.

In the example of FIG. 2, that the relative volumes of fluid in cavity 217 and cavity 218 can be varied by any suitable combination of adjusting the voltage of voltage source 220 and/or by varying the duty cycle of electrical pulses using switch 219.

Figure 3A:
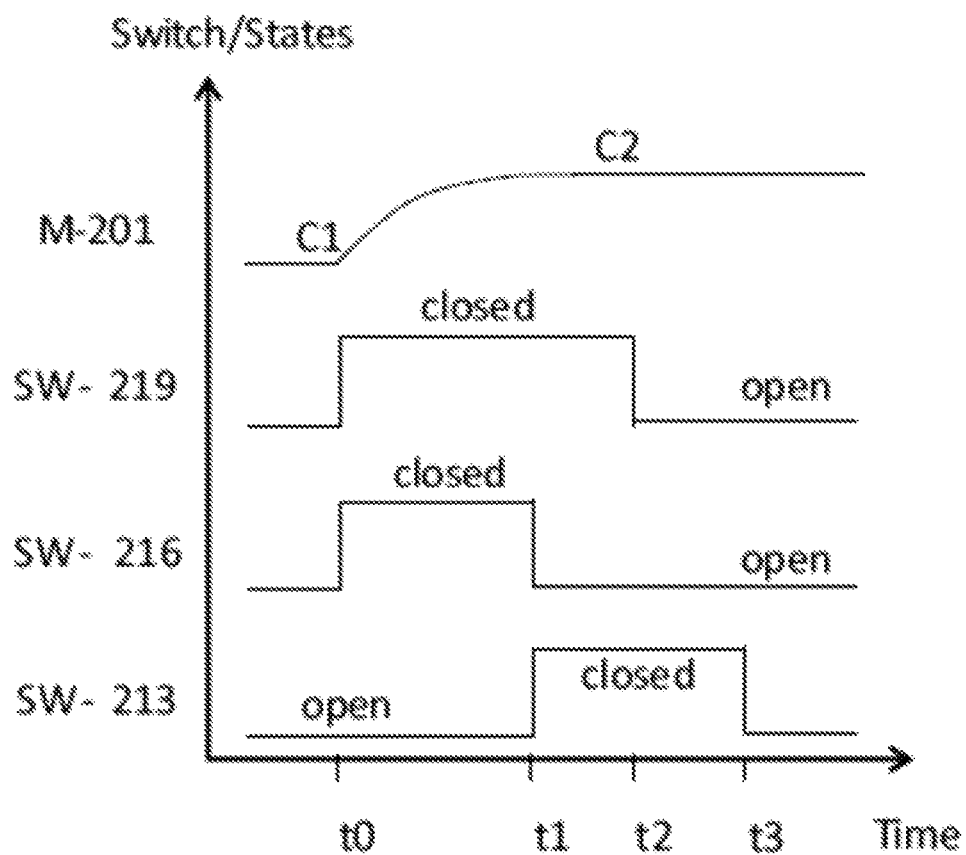
FIGS. 3A-3B depict an illustrative sequence of actuator state change for the fluidic actuator of FIG. 2, according to some aspects.
Figure 3B:
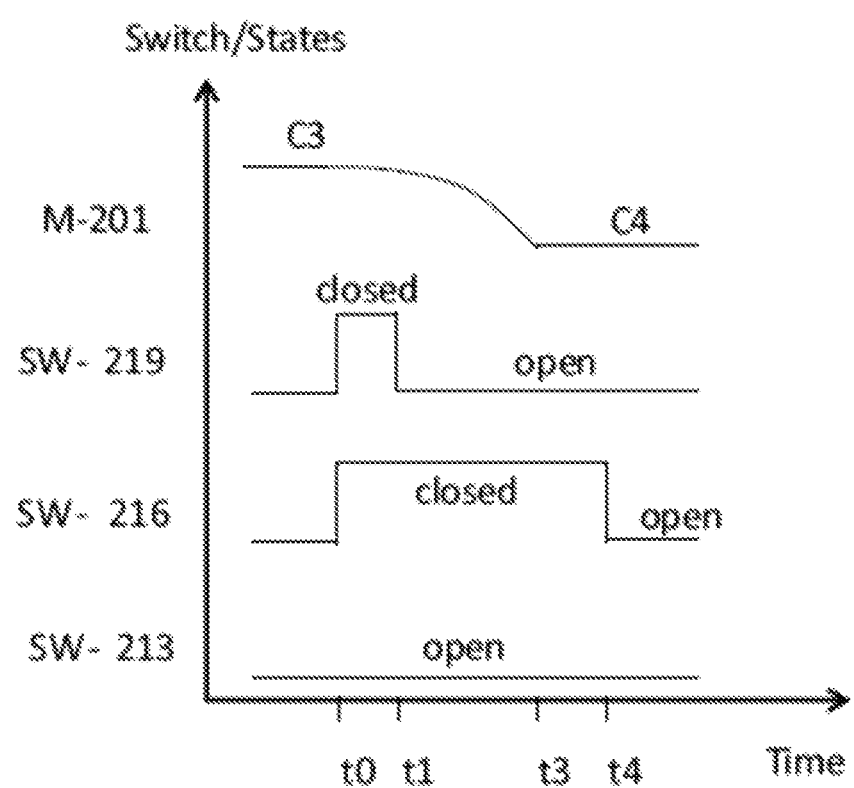

FIGS. 3A-3B depict an illustrative sequence of actuator state change for the fluidic actuator of FIG. 2, according to some aspects. As discussed above, higher pressures can be produced and maintained in cavity 217 compared with cavity 218 by opening and closing switches 213, 216 and 219 in a proper sequence. FIGS. 3A-3B provide examples of such a sequence.

In the example of FIG. 3A, time is shown along the horizontal axis and states of switches 213, 216 and 219 in addition to a level of pressure of membrane 201. Waveforms SW-219, SW-216, and SW-213 refer to the states of switches 219, 216, and 213, respectively in FIG. 2. At an initial time, the switches 213, 216 and 219 are open and the pressure at membrane 201 is at an initial level C1. At time t0, switch 216 is closed to open valve 203, and switch 219 is closed to decrease the pressure in cavity 217. Between time t0 and t1, fluid can flow from cavity 218 to cavity 217. At time t1, once the actuator has reached an intended state C2, the switch 216 is opened and switch 213 is closed, which causes the valve 203 to begin to close. Once the valve has reached a fully closed state at time t2, the power supplied to the actuator is cut by opening switch 219. The power to valve 213 is turned off at time t3, after holding time t3-t2. This holding time t3-t2 can be between zero millisecond to hundreds of seconds, preferably between 10 ms and 40 ms, or between 20 ms and 30 ms. The higher state C2 ensures positive pressure in an active cavity to close the valve in the absence of external power to the valve 213.

FIG. 3B illustrates a subsequent process of the actuator returning from a higher state C3 to a lower state C4. At an initial time, the switches 213, 216 and 219 are open and the pressure at membrane 201 is at an initial level C3. At time t0, switch 216 is closed to open valve 203, and switch 219 is closed to decrease the pressure in cavity 217. This can produce a sufficient equalization of pressure between cavities 217 and 218 to allow the valve 203 to be opened (although equal pressures are not necessarily required). The switch 219 is opened at time t1, which causes fluid to flow from cavity 217 to cavity 218 and enables an actuator state change from higher state C3 to lower state C4. Once the change of state is complete at t3, switch 216 can be opened at time t4. The time span t4-t3 can range from, but is not limited to, zero millisecond to hundreds of seconds, preferably between 10 ms and 40 ms, or between 20 ms and 30 ms.

Figure 4:
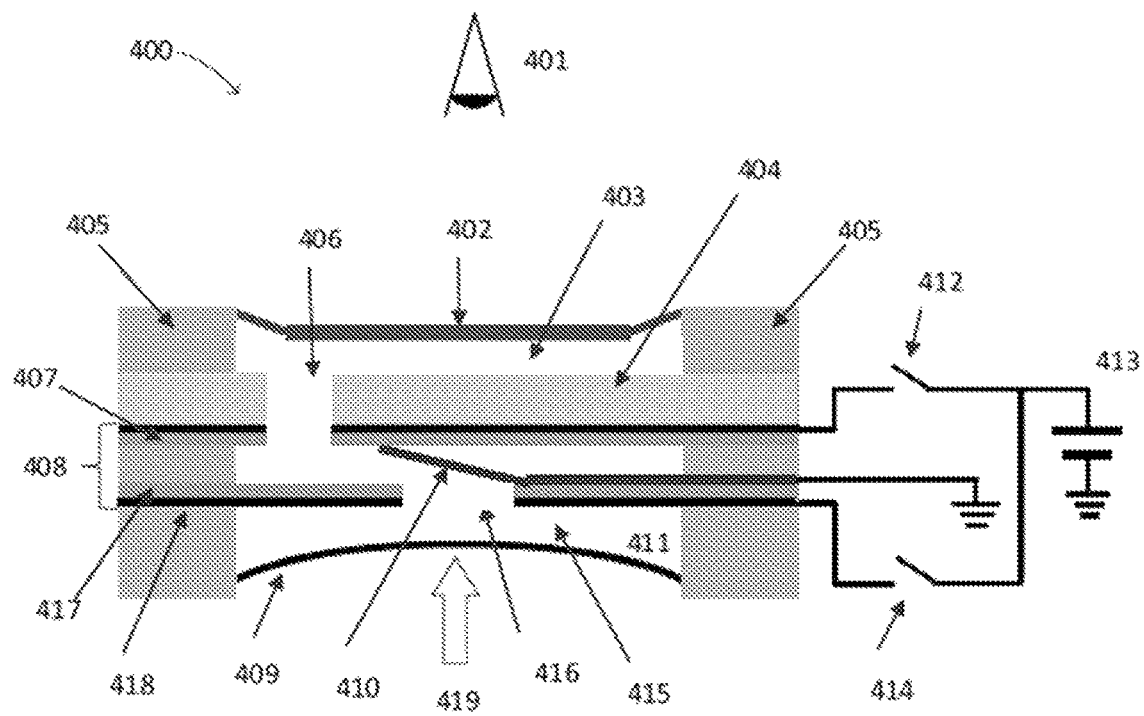
FIG. 4 is a cross-sectional schematic of an illustrative fluidic display unit, according to some aspects.

FIG. 4 is a cross-sectional schematic of an illustrative fluidic display unit, according to some aspects. Fluidic display unit 400 is provided as one possible implementation of fluidic display unit 110 shown in FIG. 1 and discussed above. In the example of FIG. 4, fluidic display unit 400 includes a transparent membrane 402, a reflector 404, and a membrane 409, which are each coupled to a frame 405. In the example of FIG. 4, the interior of the display unit 400, bounded by the membranes 402 and 409 and the frame 405, includes a fluid 411.

In the example of FIG. 4, a variable force 419 can be applied to membrane 409, which can cause fluid 411 to be pushed toward the membrane 402. In some aspects, the variable force 419 can be applied via a fluidic actuator, such as fluidic actuator 120 shown in FIG. 1, fluidic actuator 200 shown in FIG. 2, or fluidic actuator 500 shown in FIG. 5 (to be discussed below) mechanically coupled to the membrane 409. Variable force 419 can be transferred through membrane 409 and cause an increase in fluid pressure within cavity 415 relative to cavity 403, forcing fluid 411 to flow from cavity 415 to cavity 403. When fluid 411 is allowed to flow into cavity 403, an observer 401 can observe a change in one or more optical properties of the display unit. For instance, if the fluid 411 includes an ink, the observer 401 can observe a change in contrast of the pixel device, such as from a comparatively brighter to a comparatively darker shade. When variable force 419 is removed or otherwise reduced, the membrane 409 can returns to (or towards) its natural state, consequently decreasing the pressure in cavity 415.

In the example of FIG. 4, membranes 402 and 409 can function as counter-acting springs with respect to fluid 411. When variable force 419 is reduced, and membrane 409 relaxes, the pressure in cavity 415 can decrease relative to the pressure in cavity 403, causing the ink fluid 411 to flow from pixel cavity 403 to cavity 415 through aperture 416. In the example of FIG. 4, membranes 402 and 409 bulge inward, creating negative pressure within device 400 with respect to the outer pressure. According to some aspects, fluid 411 can fully or partially fill the cavities and channel within device 400.

In the example of FIG. 4, valve 408 includes layers 407 and 417, spacer layer 417, and flap 410. The layers 407 and 417 can be patterned with channels to form apertures, allowing the fluid 411 to flow between cavities 403 and 415.

In the example of FIG. 4, layers 407 and 417 are laminated with an electrically conductive material electrically coupled to switch 412 and switch 414, respectively, which are in turn coupled to a power source 413 (e.g., a battery, a high-voltage DC-DC converter, a high voltage AC-DC converter, or a rectified transformer). These layers of electrically conductive material, referred to henceforth as electrode layers, can be configured for electrostatic actuation with respect to flap 410. In particular, by opening and closing the switches 412 and 414, differences in electric potential between the flap 210, which is coupled to ground, and the layers 407 and/or 417 can be produced. The flap can include a conductive polymer, or a laminate of a dielectric polymer and a conductive layer, and thereby be attracted to an adjacent layer 407 or 417 when such a potential difference exists. As a result, the flap can be opened and closed with respect to aperture 416 by activation of the switches 412 and 414.

If the aperture 416 is open, fluid 411 is able to flow between cavity 403 and cavity 415. However, the flow will stop and cavity 403 remain under relatively high pressure with respect to the pressure in cavity 415 when aperture 416 is closed and an external force 419 removed from membrane 409. Further, because of the position and size of the flap and the larger negative pressure in cavity 415 relative to cavity 403, the flap can be maintained at a closed position when external force 419 is removed. In this fashion, the actuation can be maintained without the need of a continuous force 419 or power connected to valve 408.

Figure 5:
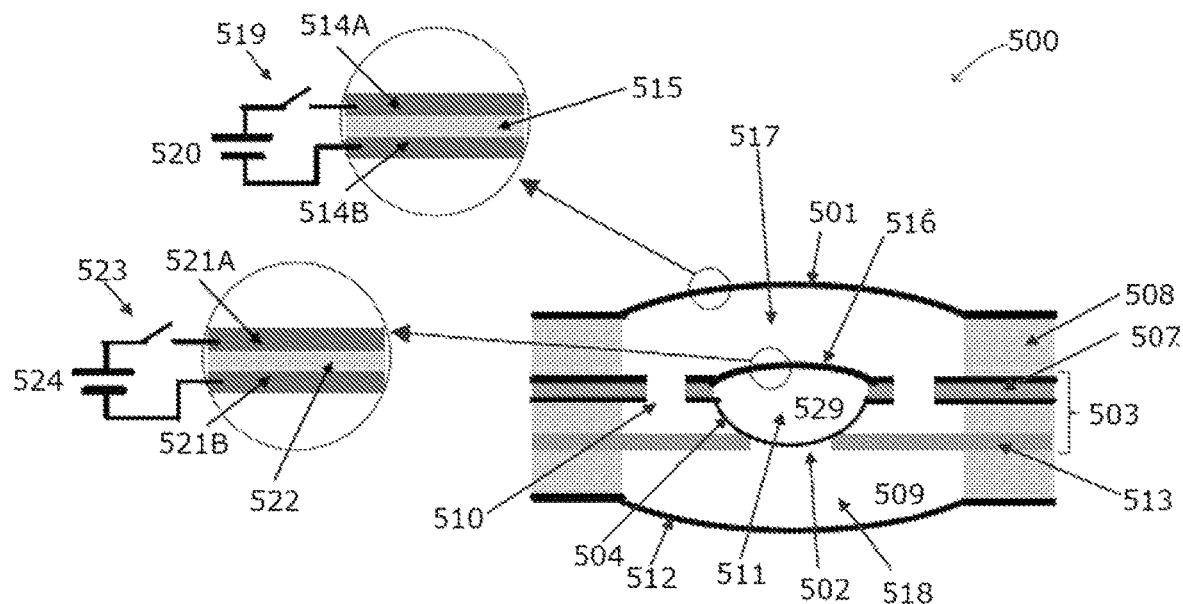
FIG. 5 is a cross-sectional schematic of a second illustrative fluidic actuator, according to some aspects.

FIG. 5 is a cross-sectional schematic of a second illustrative fluidic actuator, according to some aspects. Fluidic actuator 500 is provided as another possible implementation of fluidic actuator 120 shown in FIG. 1 and discussed above. In the example of FIG. 5, fluidic actuator 500 includes active membrane 501 and passive membrane 512 which are coupled to a frame 508. Fluidic actuator 500 can be controlled to produce varying amounts of pressure at the membrane 501 as discussed below. As such, the actuator 500 can apply a variable force to an element, such as a fluidic display unit, that is mechanically coupled to the membrane 501.

In the example of FIG. 5, the interior of the actuator, bounded by the membranes 501 and 512 and the frame 508, includes a fluid 509. A valve 503, which includes a cavity 511 bounded in part by an active membrane 516 and passive membrane 504, controls whether fluid 509 can flow between the upper cavity 517 and the lower cavity 518. The cavity 511 includes a fluid 529 which can be the same fluid, or a different fluid, as fluid 509. In some aspects, fluid 529 and/or fluid 509 can be a dielectric fluid.

In the example of FIG. 5, the pair of membranes 504 and 516 within the valve 503 can function as counter-acting springs with enclosed fluid 529. For instance, the springs can be arranged in a force balance that determines the shape of each counteracting spring. In the absence of electrical power in membrane 516, when switch 523 is open, passive membrane 504 blocks aperture 502, inhibiting or preventing the flow of fluid through the aperture.

Figure 6A:
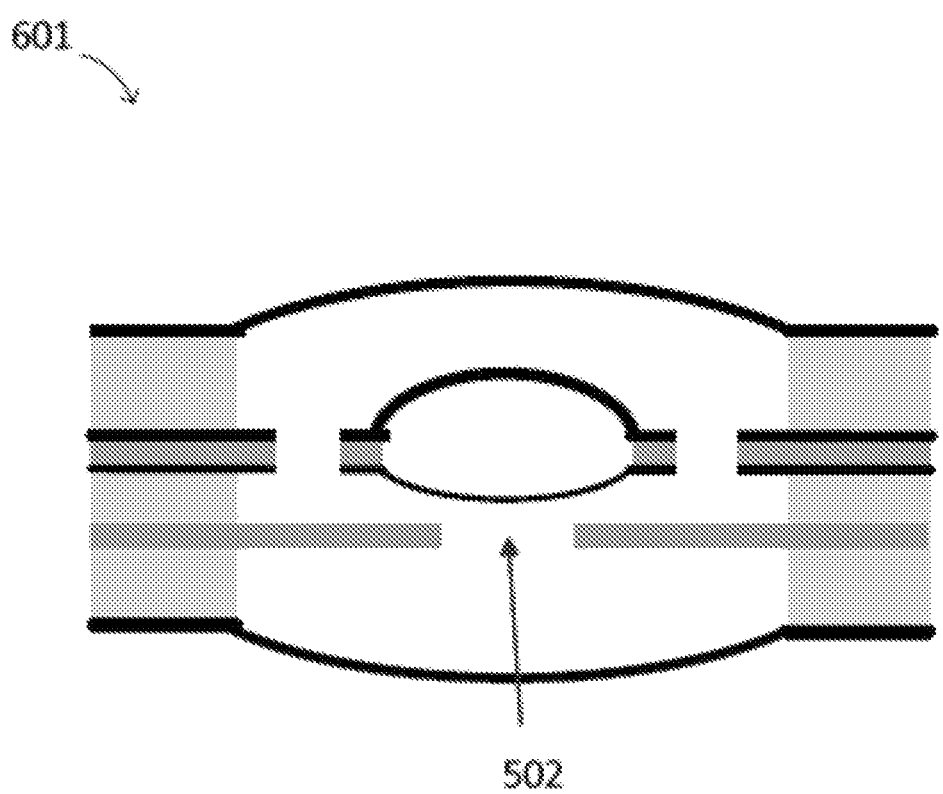
FIGS. 6A-6B depict an illustrative sequence in actuating the fluidic actuator of FIG. 5, according to some aspects.

In an initial state, passive layer 504 can be compressed against aperture 502, thus forming a closed valve and inhibiting or preventing the flow of fluid between cavities 517 and 518. When switch 523 is closed, electrostatic attractions between electrodes 521A and 521B squeeze membrane 522. Since the membranes are essentially non-compressible, the negative strain in the thickness direction causes positive strain in the lateral dimensions. This lateral strain is seen as surface area expansion of dielectric elastomer membranes 516, causing a fluid pressure decrease in cavity 511 and contraction in membrane 504. This contraction retracts membrane 504 from aperture 502, opening the valve to allow for fluid flow between cavity 517 and 518. The greater the voltage source 524, the larger the aperture 502 opens, making fluid flow more easily. The state of actuator when the valve is open is illustrated in system 601 shown in FIG. 6A, and the state of the actuator when the valve is closed is illustrated in system 602 shown in FIG. 6B.

Figure 7:
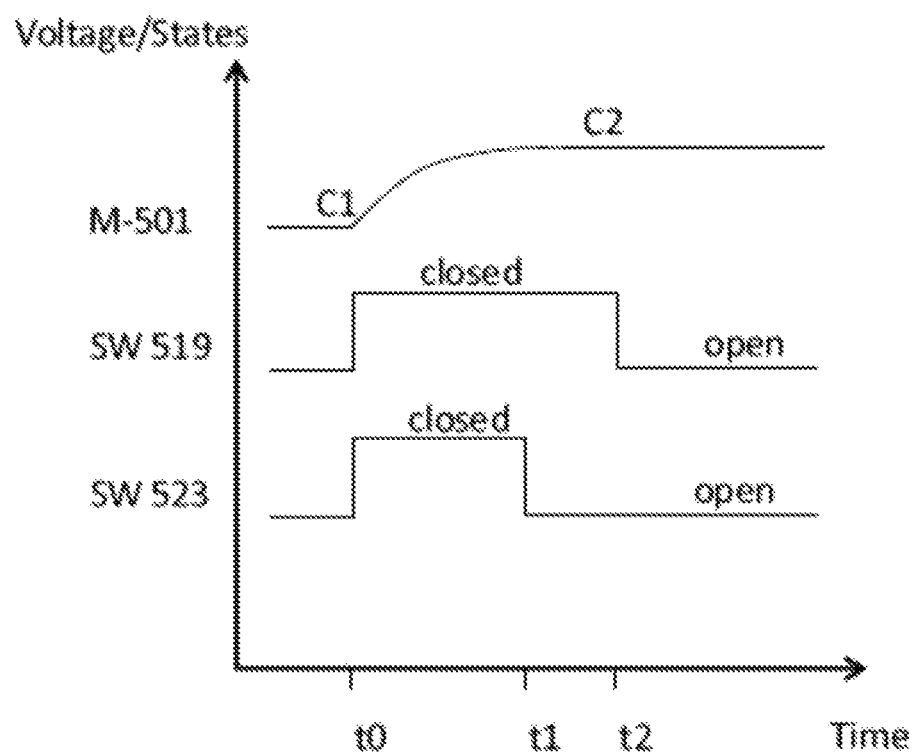
FIG. 7 depicts an illustrative sequence of actuator state change for the fluidic actuator of FIG. 5, according to some aspects.

FIG. 7 depicts an illustrative sequence of actuator state change for the fluidic actuator of FIG. 5, according to some aspects. Prior to time t0, the switches 519 and 523 are open and the actuator 500 is in a state C1, representing a first level of pressure at membrane 501. At time t0, aperture 502 is opened by closing switch 523. At the same time, or at approximately the same time, switch 519 is closed, causing the stiffness of membrane 501 to decrease, reducing the pressure in cavity 517, and driving fluid 509 to flow from cavity 518 to cavity 517.

Figure 6B:
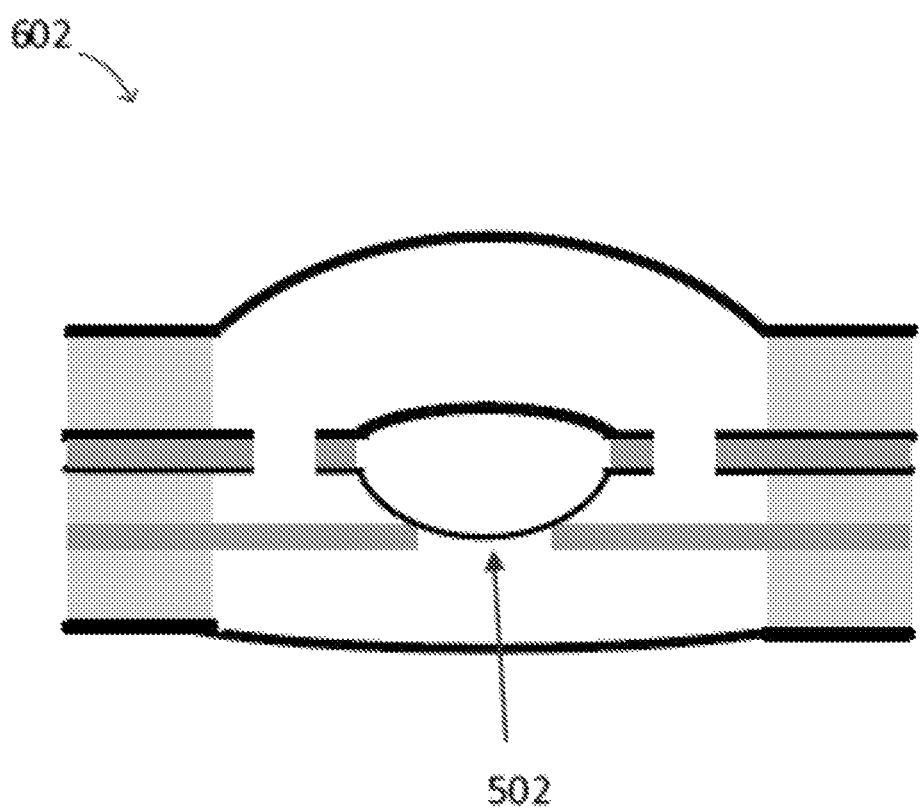

Once aperture 502 opens, the actuator state, which is dictated by the relative volumes of fluid in cavity 517 and cavity 518, can be adjusted by controlling the magnitude of electrical charge delivered to membrane 501 (e.g., via electrodes 514A and 514B). The charge magnitude can be adjusted by varying voltage source 520 or by varying the duty cycle of electrical pulses using switch 519. After the actuator reaches a desired state at time t1, the power to active valve membrane 516 is removed by opening switch 523, causing aperture 502 to close. At time t2, the power to membrane 501 is turned off by opening switch 519. At this point, the actuator state can be maintained while all switches are turn off. This state is illustrated in FIG. 6B.

Having described a display device comprising a fluidic actuator and a fluidic display unit coupled to the actuator, it will be appreciated that a display device can contain multiple such actuators and display units so that an image or other combination of optical elements can be produced. For instance, many instances of the elements shown in FIG. 1 can be arranged in an array and addressed individually so that an image can be produced. In some cases, fluidic display units can each represent a sub-pixel of a display and contain one of a number of primary subtractive colors (e.g., one of red, green, or blue; or one of cyan, magenta or yellow). By displaying a suitable amount of these colors at each sub-pixel, an image that appears to be comprised of many colors can be produced from a display.

It will further be appreciated that, in such a collection of fluidic actuators and display units, there are numerous approaches to electrically actuating individual and/or groups of actuators or display units to achieve a desired behavior. Some non-limiting examples of suitable approaches are discussed below in relation to FIGS. 8-10.

Figure 8A:
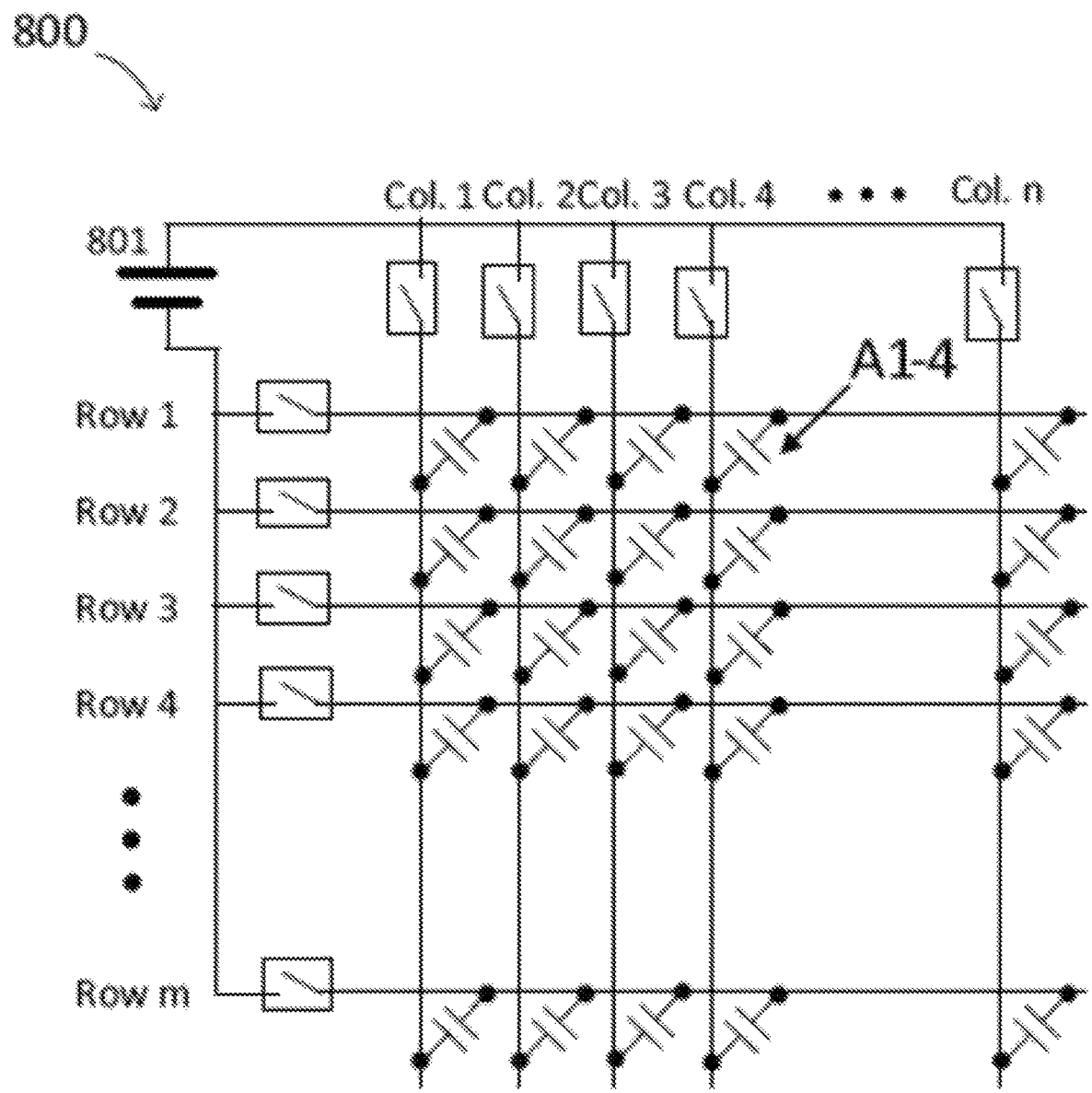
FIGS. 8A-8B depict an illustrative configuration for providing electrical actuation of an array of fluidic actuators, according to some aspects.
Figure 8B:
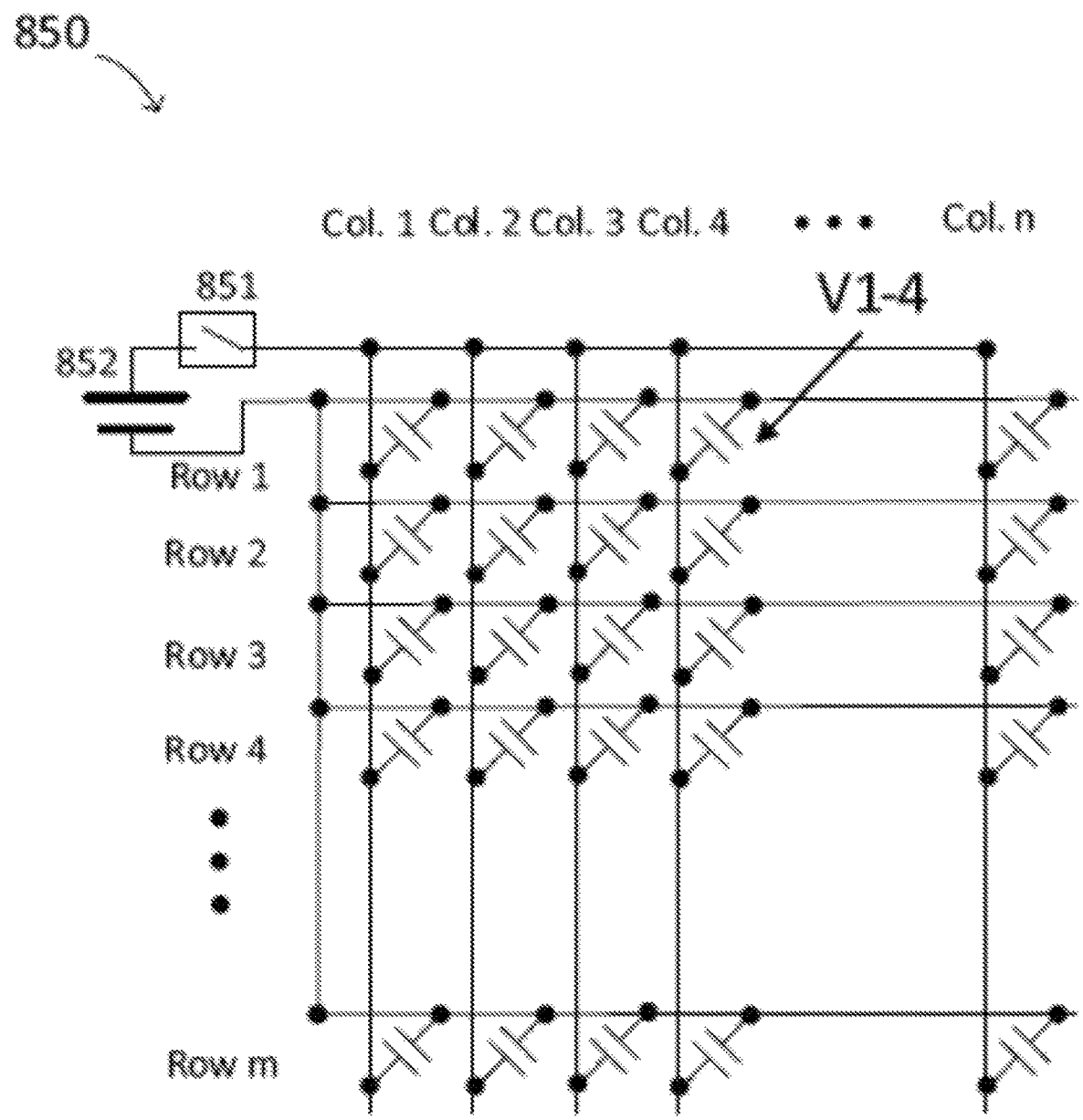

FIGS. 8A-8B depict an illustrative configuration for providing electrical actuation of an array of fluidic actuators, according to some aspects. In the example of FIGS. 8A-8B, a connected array of fluidic actuators is depicted, with each active element being represented by a capacitor symbol.

The depicted array can correspond to, for example, the illustrative fluidic actuator 500 shown in FIG. 5, wherein the arrangement 800 of FIG. 8A provides for actuation of active membrane 501 and the arrangement 850 of FIG. 8B provides for actuation of active membrane 516. In this example, illustrative active element A1-4 in FIG. 8A can correspond to the active membrane 501 and allow for actuation of said membrane, whereas illustrative active element V1-4 in FIG. 8B can correspond to the active membrane 516 and allow for opening and closing of the valve 503. As a result, each instance of the active membrane 501 in the array 800 can be individually addressed by closing suitable combinations of the row and column switches.

For instance, the row switches can be scanned in a cyclic manner whilst selected column switches are closed in synchronization. Furthermore, the valves of each actuator in the array can be collectively opened and closed by opening and closing switch 851 in FIG. 8B. When states of each of the actuators in the array are updated or refreshed, switch 851 can be closed to open the valve in each actuator, allowing the fluid to flow in that actuator (as dictated by the state of the corresponding active membrane in the array 800). Once all actuators reach their desired states, switch 851 can be opened. For example, a single fluidic actuator 500 can include active membrane A1-4 and active membrane V1-4 and be controlled in the manner described above in relation to FIG. 5 by opening and closing the row 1 and column 4 switches in FIG. 8A (in which case the combination of these switches corresponds to switch 519 in FIG. 5) and by opening and closing switch 851 (in which case the combination of these switches corresponds to switch 523 in FIG. 5).

Figure 9:
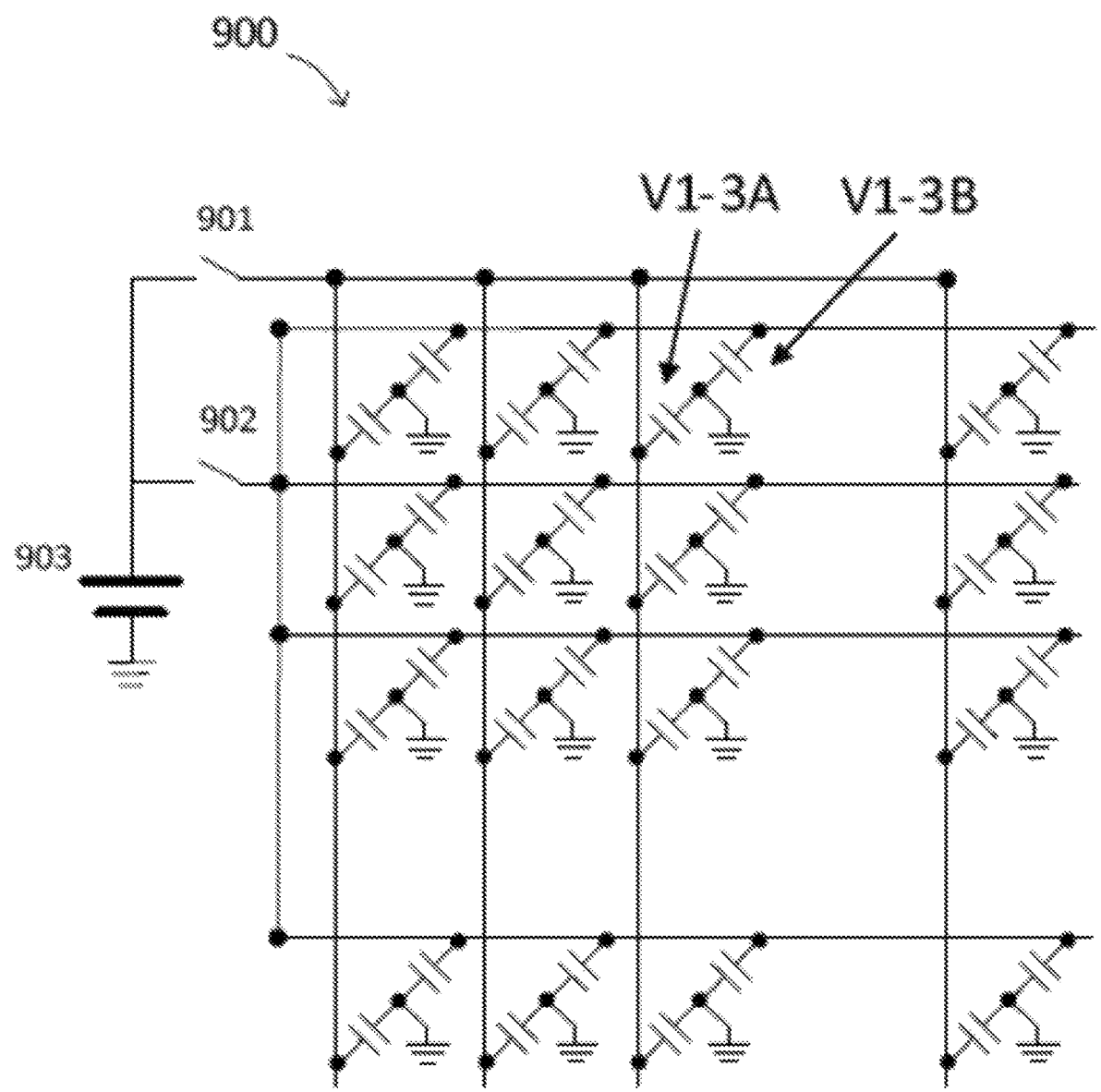
FIG. 9 depicts an illustrative configuration for providing electrical actuation of an array of valves of fluidic actuators, according to some aspects.
Figure 10:
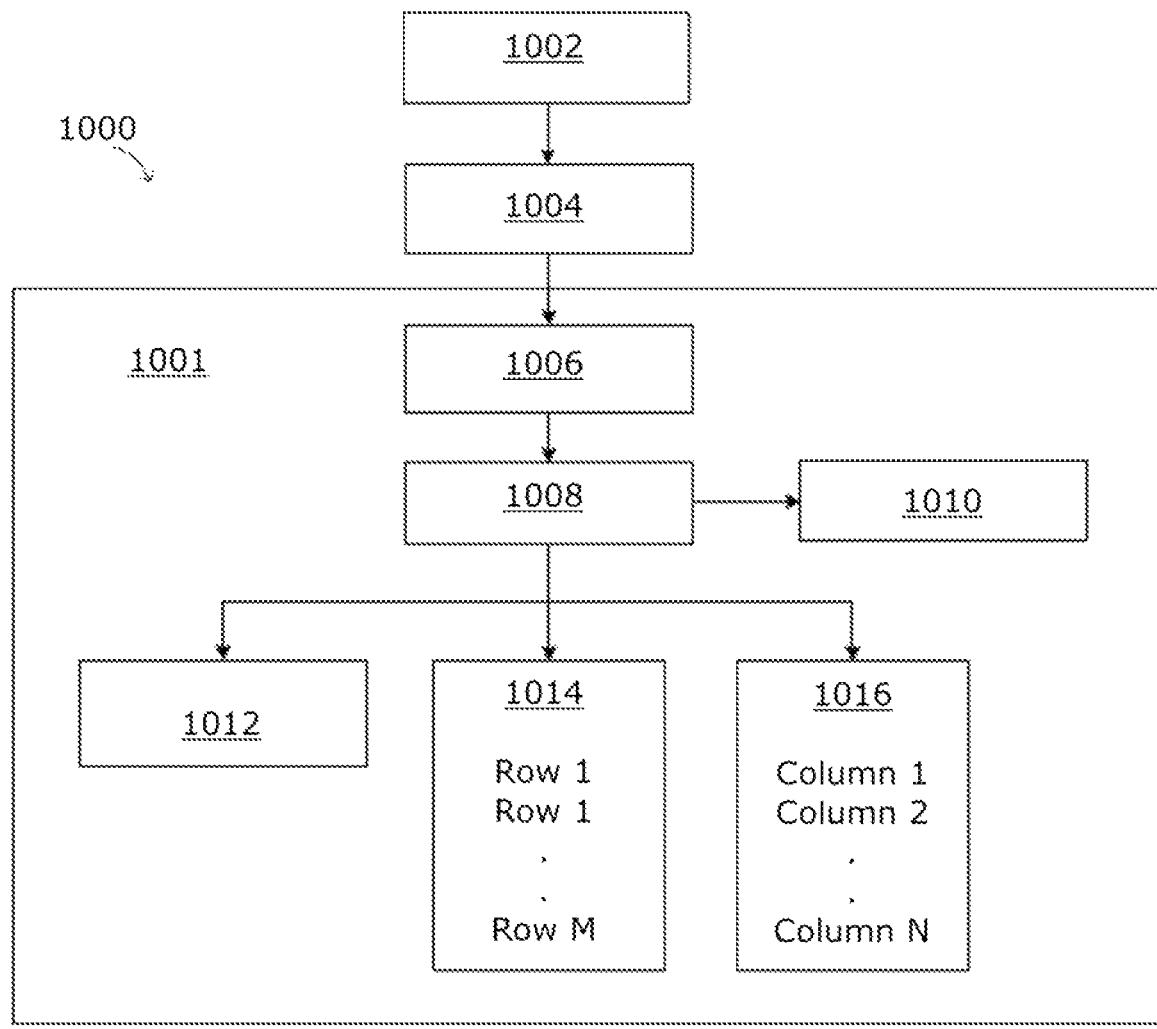
FIG. 10 is a block diagram of a suitable control system for the array of FIG. 9, according to some aspects.

FIG. 9 depicts an illustrative configuration for providing electrical actuation of an array of valves of fluidic actuators, according to some aspects. The depicted array 900 can correspond to, for example, the illustrative fluidic actuator 200 shown in FIG. 2, wherein the array provides for actuation of valves 203 by controlling corresponding switches. In the example of FIG. 9, switch 901 can represent a switch 216 for each of the valves and switch 902 can represent switch 213 for each of the valves. This approach can therefore allow opening and closing of all of the valves in the array in concert by opening and closing switches 901 and 902 in an appropriate sequence. A single valve control arrangement such as shown in FIG. 9 can enable for comparatively simple wiring relative to actively addressed alternative configurations, and can eliminate the need of multiple control electronics to control the valve. A corresponding control diagram for the combined switch valve array of FIG. 9 is shown in FIG. 10.

In a typical operation of the display, a user can employ user interface 1002, which can be a computer workstation, to provide a vector image or a bitmap image, and make adjustments regarding the image appearance and the timing of display. The computing device 1004 can process the image into a suitable format for the display hardware containing desired color state information. This information can be sent to the microcontroller 1006 at a scheduled time. Microcontroller 1006 can update the display hardware state by turning on power supply 1010 and timely activating switches 1008, which can correspond to, for example, the illustrative array of switches 800 and switch 850 shown in FIGS. 8A and 8B, respectively.

Figure 11:
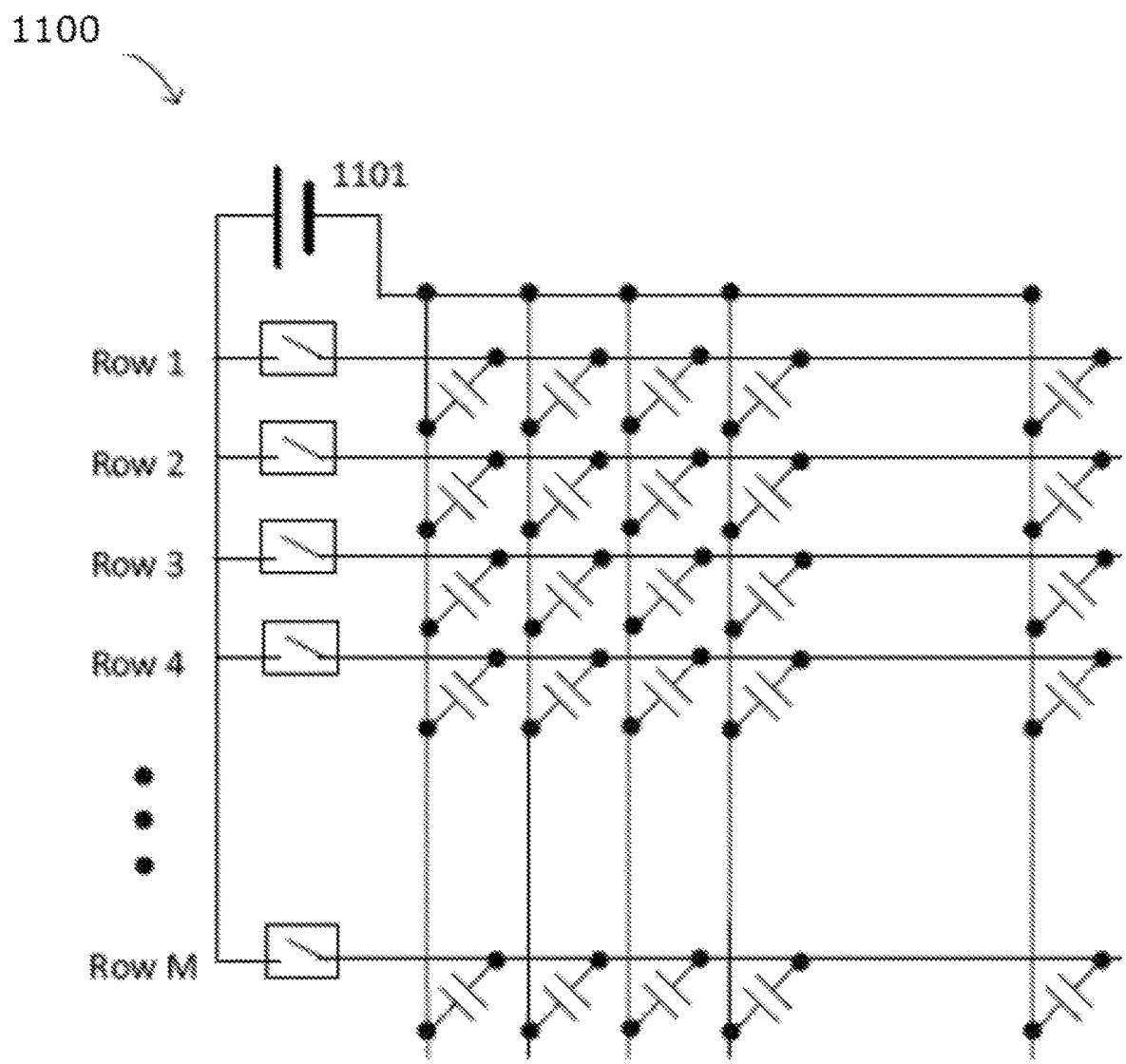
FIG. 11 depicts an illustrative configuration for providing electrical actuation of an array of valves of fluidic actuators by row, according to some aspects.

As an alternative to FIG. 9, the control of the valves of the array could be divided into small zones that could be controlled independently. An example of this approach is to control the valves by row, which is illustrated in FIG. 11. In the example of FIG. 11, the valves are grouped into row zones, where the rows are controlled by switches Row 1 to Row M. The approach of FIG. 11 can have an advantage of reducing cross talk between pixels, which can consequently improve display image quality and overall performance. In some aspects, each row zone can control a group of actuators that correspond to subpixels containing one kind of primary color. For example, row zone A, row zone B, and row zone C can respectively control cyan, magenta, and yellow subpixels throughout the display, or throughout a portion of the display. By addressing row zones which correspond to subpixel colors in the display, crosstalk between neighboring subpixels can be minimized, since subpixels containing different primary colors are physically stacked on top of each other, therefore coupled as springs, separated with a membrane that can partially transfer the actuation force to other subpixel colors during display state changes, particularly susceptible to error during such transitions. Addressing row zones by color helps ensure that adjustment of one subpixel color is independent of other subpixel color states during an image change.

Figure 12:
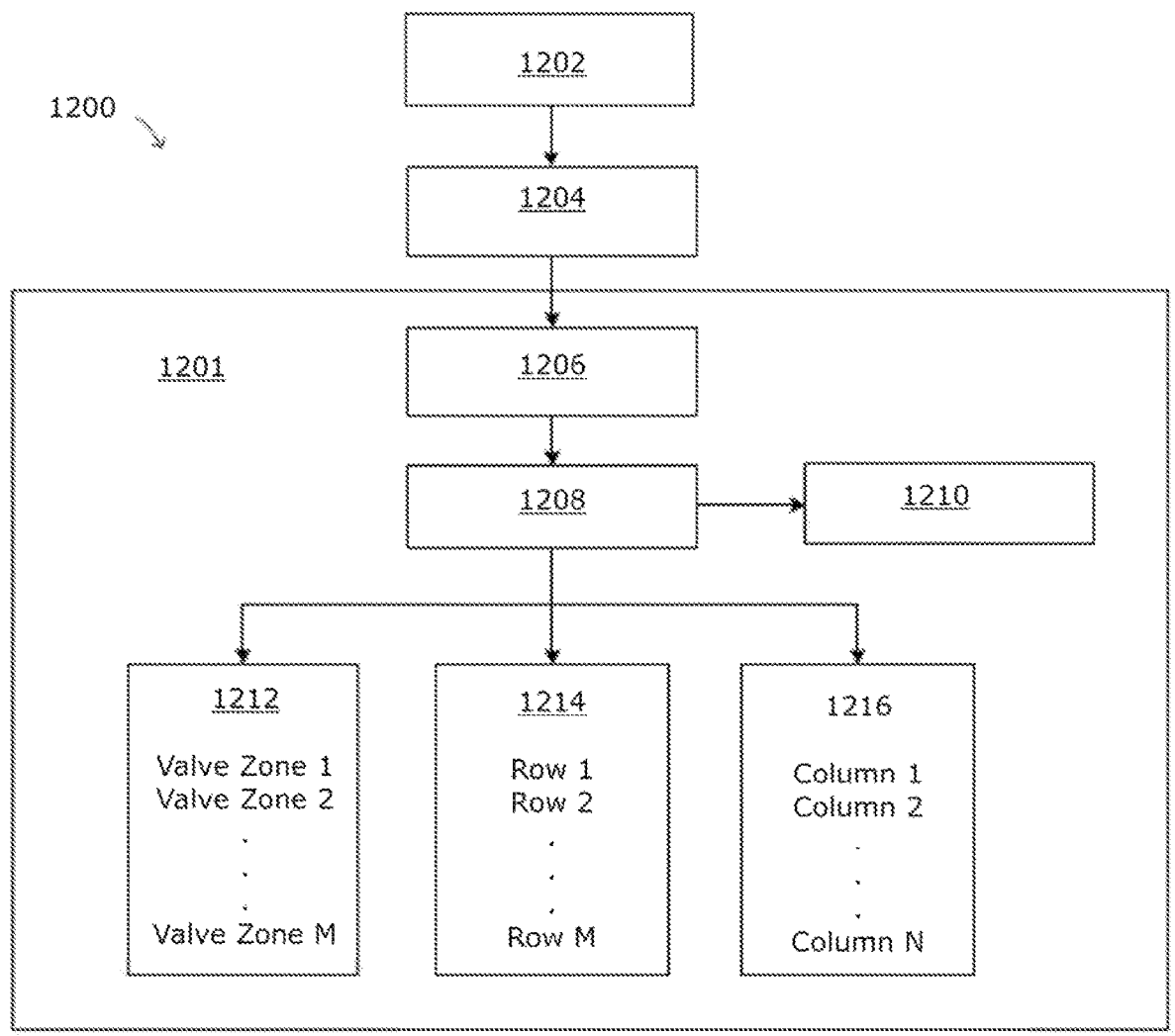
FIG. 12 is a block diagram of a suitable control system for the array of FIG. 10, according to some aspects.

A corresponding control diagram for the combined switch valve array of FIG. 11 is shown in FIG. 12. As with the example of FIG. 10, a user can employ user interface 1202, which can be a computer workstation, to provide a vector image or a bitmap image, and make adjustments regarding the image appearance and the timing of display. The computing device 1204 can process the image into a suitable format for the display hardware containing desired color state information. This information can be sent to the microcontroller 1206 at a scheduled time. Microcontroller 1206 can update the display hardware state by turning on power supply 1210 and timely activating switches 1208, which can correspond to, for example, the illustrative array of switches 800 and switch 850 shown in FIGS. 8A and 8B, respectively.

Improvements in display device lifetime are expected to be meaningful employing this multistability mechanism, as the integrated electrical stress experienced by the dielectric elastomer actuator is reduced greatly. For example, if the display device is energized for 1 s in the course of displaying an image, and the multistability mechanism is engaged to fix the image in place for the next 7 s, electrical stress is removed from the dielectric elastomer element responsible for controlling the ink levels in the display for ⅞ths of the time of operation. Investigations into dielectric elastomer reliability [Zhang, 2017] suggest that dielectric elastomer actuator lifetime can be related to duration of time under electrical stress because of aging processes that degrade the dielectric. The present disclosure provides a mechanism to enable 'change and hold' display device functionality in a manner that significantly reduces electrical stress on the active membranes 201 or 501, therefore extending total device lifetime considerably. Other combinations of actuator-on/multistability mechanism-off actuator-off/multistability mechanism-on driving schemes can be employed to similar effect, depending on the desired duration of image hold versus image refresh.

Reductions in power consumption from employing this multistability mechanism are significant, which are dependent on the image refresh rate, duty cycle applied to the dielectric elastomer actuator, and duration of image hold. For example, without use of the multistability mechanism, a densely-packed dielectric elastomer actuator array of 972 individual 8.3 mm diameter actuators arranged in an 18×18 pixel array, over an area of 1 ft2, each operating at 1 kV, drawing 0.35 uA/actuator would consume 0.34 W/ft2 at steady-state when driven at a 100% duty cycle, having an 6 s image hold, and a 1 s image switching time. The same system operating under the same conditions but using the multistability mechanism to 'latch' the image and remove electrical stress from the dielectric elastomer actuator array after the image is displayed, and 'released' during image update would consume 0.049 W/ft2, neglecting the power required to operate the multistability mechanism. This is a nearly 86% reduction in energy consumption.

In another device configuration with a 27 element array of dielectric elastomer actuators, each 15.3 mm in diameter drawing 1 mW at steady state operation, the system would draw 27 mW to display the image without the multistability mechanism. The imperfection of fluid sealing in any aperture 210, 416, or 502 within the present system dictates refreshing the multistability mechanism due to fluid leakage through apertures 210, 416, or 502, yielding a power draw of approximately 4 mW to maintain the displayed image after power is withdrawn from the active membranes 201, 501, or 516. With lower amounts of unintended liquid leakage through apertures 210, 416, or 502 via more effective sealing, lower power is required to maintain the displayed image, such as 0.4 mW for the 27 element array.

Further energy use analysis for a 27 element array of dielectric elastomers, each 15.3 mm in diameter, is illustrated by the following descriptions for three scenarios of operation.

TABLE 1

Energy Use Analysis for 27 Element Array Without MultiStability Mechanism

| | |
|---|---|
| power supply draw to operate image update power consumption to refresh the image | 2100 mW 2200 mW |
| continuously maintaining charge on the dielectric elastomer actuator | 40 mW |
| maintaining the multistable mechanism's state | 0 mW |
| Total Image Refresh Energy Consumption | 2200 mW |
| Total Continuous Energy Consumption | 2140 mW |

TABLE 2

Energy Use Analysis for 27 Element Array With MultiStability Mechanism Having a Sleep State (partially active)

| | |
|---|---|
| power supply draw to operate image | 21 mW |
| update power consumption to refresh the image | 2200 mW |
| maintaining the multistable mechanism's state | 4 mW |
| Total Image Refresh Energy Consumption | 2200 mW |
| Total Continuous Energy Consumption | 25 mW |

TABLE 3

Energy Use Analysis for 27 Element Array With MultiStability Mechanism Having a Hibernation State (theoretical no power draw when not active)

| | |
|---|---|
| power supply draw to operate image update electronics in hibernation state | 0 mW |
| update power consumption to refresh the image | 2200 mW |
| maintaining the multistable mechanism's state | 0 mW |
| Total Image Refresh Energy Consumption | 2200 mW |
| Total Continuous Energy Consumption | 0 mW |

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The present disclosure will be better understood upon reading the following aspects, which should not be confused with the claims. Each of the number aspects described below can in some instances be combined with one or more additional aspects described below as well as with one of more of the aforementioned aspects of the disclosure.

Aspect 1. A display device configured to alter an optical property by moving an amount of a first fluid through which external light can pass, the display device comprising: a fluidic display unit comprising at least a first cavity comprising a first fluid, the first fluid movable within the first cavity by varying an amount of pressure on the first cavity; and a fluidic actuator mechanically coupled to the fluid-filled cavity of the fluidic display unit, the fluidic actuator comprising a second fluid, wherein the fluidic actuator is configured to be electrically actuated to vary the amount of pressure on the first cavity of the fluidic display unit, wherein varying the pressure causes movement of the first fluid within the fluidic display unit, thereby altering the optical property of the display.

Aspect 2. The display of any one of Aspects 1-14, wherein the first fluid is chosen from an ink, a dye, a pigment, a solution of any of the foregoing, and a combination thereof.

Aspect 3. The display of any one of Aspects 1-14, wherein the fluidic actuator comprises at least one dielectric elastomer.

Aspect 4 The display of any one of Aspects 1-14, wherein the dielectric elastomer comprises a passive elastomer film sandwiched between two electrodes.

Aspect 5 The display of any one of Aspects 1-14, wherein the elastomer is chosen from polyacrylate elastomer, natural rubber, silicone rubber, chloroprene rubber, butyl rubber, isoprene rubber, nitrile rubber, ethylene propylene diene monomer (EPDM), acrylonitrile butadiene styrene (ABS), fluorosilicone, thermoplastic elastomer, poly(urethane) rubber, copolymers of any of the aforementioned elastomers, composites of the aforementioned with at least one inorganic filler, and combinations thereof.

Aspect 6. The display of any one of Aspects 1-14, wherein the fluidic actuator further comprises electrodes attached to opposing sides of the dielectric elastomer, and wherein varying an electric potential applied across the electrodes varies the amount of pressure applied to the fluid-filled cavity of the fluidic display unit.

Aspect 7. The display of any one of Aspects 1-14, wherein the fluidic actuator is configured to apply a plurality of different pressures to the fluid-filled cavity of the fluidic display unit, and wherein operating the actuator to switch from producing a first pressure of the plurality of different pressures to a second pressure of the plurality of different pressures causes the movement of the first fluid within the fluidic display unit.

Aspect 8. The display of any one of Aspects 1-14, wherein the second fluid is chosen from aqueous salt solutions, glycerin, glycols, polyols, silicone oils, vegetable oils, mineral oils, motor oils, lubricating oils, polyalphaolefins, ionic liquids, hydrofluoroethers, fluoroketones, silicate esters, synthetic oils, fluorinated hydrocarbons, and combinations thereof.

Aspect 9. The display of any one of Aspects 1-14, wherein the second fluid is pressurized within the fluidic actuator at a higher pressure than the first fluid is pressurized within the fluidic display unit.

Aspect 10. The display of any one of Aspects 1-14, further comprising a plurality of fluidic display units each corresponding to a pixel or sub-pixel of the display and each mechanically coupled to respective fluidic actuators.

Aspect 11. The display of any one of Aspects 1-14, wherein the fluidic display unit comprises a second cavity and a reflective layer arranged between the first cavity and the second cavity.

Aspect 12. The display of any one of Aspects 1-14, wherein the fluidic actuator comprises: a first cavity comprising the second fluid and bounded at least in part by a first elastomer; a second cavity comprising the second fluid and bounded at least in by part by a second elastomer; a channel connecting the first cavity to the second cavity and through which the second fluid can flow; and a valve configured to be electrically operated into an open state or a closed state and thereby allow or block a flow of the second fluid through the channel, respectively, wherein maintaining the valve in the closed state requires less electrical power than maintaining the valve in the open state.

Aspect 13. The display of any one of Aspects 1-14, wherein the display unit further comprises one or more reflectors such that visible light can pass through at least a portion of the fluidic display unit, be reflected from the reflector, and be output from the display unit in a viewing direction; wherein the optical property is a color of the visible light output from the display unit; wherein the fluidic actuator comprises a first cavity comprising fluid and bounded at least in part by a first elastomer; a second cavity comprising fluid and bounded at least in by part by a second elastomer; a channel connecting the first cavity to the second cavity and through which fluid can flow; and a valve configured to be electrically operated into an open state or a closed state and thereby allow or block flow of the fluid through the channel, respectively, wherein maintaining the valve in the closed state requires less electrical power than maintaining the valve in the open state; and wherein the first fluid is chosen from an ink, a dye, a pigment, a solution of any of the foregoing, and a combination thereof.

Aspect 14. The display of any one of Aspects 1-14, wherein the display unit further comprises one or more sources of visible light configured such that a visible light can pass through at least a portion of the fluidic display unit and be output from the display unit in a viewing direction; wherein the optical property is a color of the visible light output from the display unit; wherein the fluidic actuator comprises a first cavity comprising fluid and bounded at least in part by a first elastomer; a second cavity comprising fluid and bounded at least in by part by a second elastomer; a channel connecting the first cavity to the second cavity and through which fluid can flow; and a valve configured to be electrically operated into an open state or a closed state and thereby allow or block flow of the fluid through the channel, respectively, wherein maintaining the valve in the closed state requires less electrical power than maintaining the valve in the open state; and wherein the first fluid is chosen from an ink, a dye, a pigment, a solution of any of the foregoing, and a combination thereof.

Aspect 15. An actuator, comprising; a first cavity comprising fluid and bounded at least in part by a first elastomer; a second cavity comprising fluid and bounded at least in by part by a second elastomer; a channel connecting the first cavity to the second cavity and through which fluid can flow;

and a valve configured to be electrically operated into an open state or a closed state and thereby allow or block flow of the fluid through the channel, respectively, wherein maintaining the valve in the closed state requires less electrical power than maintaining the valve in the open state.

Aspect 16. The actuator of any one of Aspects 15-25, wherein maintaining the valve in the closed state requires no electrical power.

Aspect 17. The actuator of any one of Aspects 15-25, further comprising electrodes attached to opposing sides of the first elastomer, and wherein applying an electric potential across the electrodes alters the first elastomers shape and causes fluid to flow from the second cavity into the first cavity via the channel.

Aspect 18. The actuator of any one of Aspects 15-25, wherein the valve is configured to be electrically operated into at least three states which include the open state and the closed state.

Aspect 19. The actuator of any one of Aspects 15-25, wherein the fluid of the first and second cavities comprises a dielectric oil.

Aspect 20. The actuator of any one of Aspects 15-25, wherein: the valve comprises a flap arranged to move about at least one axis; the actuator comprises at least a first electrode proximate to the flap; and the actuator is configured to electrically charge the first electrode, thereby attracting the flap towards the first electrode and operating the valve into the open state.

Aspect 21. The actuator of any one of Aspects 15-25, wherein the actuator comprises a second electrode and the actuator is configured to electrically charge the second electrode, thereby attracting the flap towards the second electrode and operating the valve into the closed state.

Aspect 22. The actuator of any one of Aspects 15-25, wherein the flap is arranged over an opening of the channel and extends beyond at least one dimension of the opening such that the flap cannot pass through the opening.

Aspect 23. The actuator of any one of Aspects 15-25, wherein the valve comprises a third cavity comprising fluid and bounded at least in part by a dielectric elastomer, the dielectric elastomer comprising electrodes attached to opposing sides of a third elastomer; wherein the third cavity is arranged proximate to an opening of the channel; and wherein applying a first electric potential across the electrodes attached to the third elastomer alters the third elastomer's shape and causes the third cavity to allow fluid to flow through the opening of the channel.

Aspect 24. The actuator of any one of Aspects 15-25, wherein applying a second electric potential across the electrodes attached to the third elastomer, the second electric potential being lower than the first electric potential, causes the third cavity to block fluid from flowing through the opening of the channel.

Aspect 25. The actuator of any one of Aspects 15-25, wherein maintaining the second electric potential across the electrodes attached to the third elastomer requires no power.

Aspect 26. A display device configured to alter an optical property by moving an amount of a first fluid through which external light can pass, the display device comprising: a fluidic display unit comprising at least a first cavity comprising a first fluid, the first fluid movable within the first cavity by varying an amount of pressure on the first cavity; and a means of electrically varying the amount of pressure on the first cavity of the fluidic display unit, wherein varying the pressure causes movement of the first fluid within the fluidic display unit, thereby altering the optical property of the display.

Aspect 27. The display of any one of Aspects 26-31, wherein the means of electrically varying the amount of pressure comprises at least one dielectric elastomer.

Aspect 28 The display of any one of Aspects 26-31, wherein the dielectric elastomer comprises a passive elastomer film sandwiched between two electrodes.

Aspect 29 The display of any one of Aspects 26-31, wherein the elastomer is chosen from polyacrylate elastomer, natural rubber, silicone rubber, chloroprene rubber, butyl rubber, isoprene rubber, nitrile rubber, ethylene propylene diene monomer (EPDM), acrylonitrile butadiene styrene (ABS), fluorosilicone, thermoplastic elastomer, poly(urethane) rubber, copolymers of any of the aforementioned elastomers, composites of the aforementioned with at least one inorganic filler, and combinations thereof.

Aspect 30. The display of any one of Aspects 26-31, wherein the means of electrically varying the amount of pressure further comprises electrodes attached to opposing sides of the dielectric elastomer, and wherein varying an electric potential applied across the electrodes varies the amount of pressure applied to the fluid-filled cavity of the fluidic display unit.

Aspect 31. The display of any one of Aspects 26-31, wherein the means of electrically varying the amount of pressure is configured to apply a plurality of different pressures to the fluid-filled cavity of the fluidic display unit, and wherein operating the actuator to switch from producing a first pressure of the plurality of different pressures to a second pressure of the plurality of different pressures causes the movement of the first fluid within the fluidic display unit.

Aspect 32. The display of any one of Aspects 26-31, wherein the means of electrically varying the amount of pressure comprises an actuator according to any one of Aspects 15-25.

We claim:

1. A display device configured to alter an optical property by moving an amount of a first fluid through which external light can pass, the display device comprising:
    a fluidic display unit comprising at least a first cavity comprising a first fluid, the first fluid movable within the first cavity by varying an amount of pressure on the first cavity; and
    a fluidic actuator mechanically coupled to the fluid-filled cavity of the fluidic display unit, the fluidic actuator comprising a second fluid, a first cavity comprising the second fluid and bounded at least in part by a first elastomer, a second cavity comprising the second fluid and bounded at least in by part by a second elastomer, a channel connecting the first cavity to the second cavity and through which the second fluid can flow, and a valve configured to be electrically operated into an open state or a closed state and thereby allow or block a flow of the second fluid through the channel, wherein the fluidic actuator is configured to be electrically actuated to vary the amount of pressure on the first cavity of the fluidic display unit,
    wherein varying the pressure causes movement of the first fluid within the fluidic display unit, thereby altering the optical property of the display,
    wherein the second fluid is at a pressure within the fluidic actuator higher than a pressure of the first fluid within the fluidic display unit, and
    wherein maintaining the valve in the closed state requires less electrical power than maintaining the valve in the open state.

2. The display of claim 1, wherein the first fluid is chosen from an ink, a dye, a pigment, a solution of any of the foregoing, and a combination thereof.

3. The display of claim 1, wherein the fluidic actuator comprises at least one dielectric elastomer.

4. The display of claim 3, wherein the dielectric elastomer comprises a passive elastomer film sandwiched between two electrodes.

5. The display of claim 3, wherein the elastomer is chosen from polyacrylate elastomer, natural rubber, silicone rubber, chloroprene rubber, butyl rubber, isoprene rubber, nitrile rubber, ethylene propylene diene monomer (EPDM), acrylonitrile butadiene styrene (ABS), fluorosilicone, thermoplastic elastomer, poly(urethane) rubber, copolymers of any of the aforementioned elastomers, composites of the aforementioned with at least one inorganic filler, and combinations thereof.

6. The display of claim 3, wherein the fluidic actuator further comprises electrodes attached to opposing sides of the dielectric elastomer, and wherein varying an electric potential applied across the electrodes varies the amount of pressure applied to the fluid-filled cavity of the fluidic display unit.

7. The display of claim 1, wherein the fluidic actuator is configured to apply a plurality of different pressures to the fluid-filled cavity of the fluidic display unit, and wherein operating the actuator to switch from producing a first pressure of the plurality of different pressures to a second pressure of the plurality of different pressures causes the movement of the first fluid within the fluidic display unit.

8. The display of claim 1, wherein the second fluid is chosen from glycerin, glycols, polyols, silicone oils, vegetable oils, mineral oils, motor oils, lubricating oils, polyalphaolefins, hydrofluoroethers, fluoroketones, silicate esters, synthetic oils, fluorinated hydrocarbons, and combinations thereof.

9. The display of claim 1, wherein altering the optical property includes changes in the color produced when white light is reflected from the display unit.

10. The display of claim 1, further comprising a plurality of fluidic display units each corresponding to a pixel or sub-pixel of the display and each mechanically coupled to respective fluidic actuators.

11. The display of claim 1, wherein the fluidic display unit comprises a second cavity and a reflective layer arranged between the first cavity and the second cavity.

12. The display of claim 1, wherein the fluidic actuator further comprises one or more reflectors such that visible light can pass through at least a portion of the fluidic display unit, be reflected from the reflector, and be output from the display unit in a viewing direction.

13. The display of claim 12, wherein the optical property is a color of the visible light output from the display unit; and
wherein the first fluid is chosen from an ink, a dye, a pigment, a solution of any of the foregoing, and a combination thereof.

14. The display of claim 12, wherein the one or more reflectors comprise one or more of paper, Teflon, white painted surfaces, titanium oxide particles, barium sulfate coatings, silver mirrors, indium tin oxide coatings, or combinations thereof.

15. The display of claim 1, wherein the display unit further comprises one or more sources of visible light configured such that a visible light can pass through at least a portion of the fluidic display unit and be output from the display unit in a viewing direction;
wherein the optical property is a color of the visible light output from the display unit; and
wherein the first fluid is chosen from an ink, a dye, a pigment, a solution of any of the foregoing, and a combination thereof.

16. The display of claim 1, wherein maintaining the valve in the closed state requires no electrical power.

17. The display of claim 1, further comprising electrodes attached to opposing sides of the first elastomer, and wherein applying an electric potential across the electrodes alters the first elastomer's shape and causes fluid to flow from the second cavity into the first cavity via the channel.

18. The display of claim 1, wherein the valve is configured to be electrically operated into at least three states which include the open state and the closed state.

19. The display of claim 1, wherein the fluid of the first and second cavities comprises a dielectric oil.

20. The display of claim 1, wherein:
the valve comprises a flap arranged to move about at least one axis;
the actuator comprises at least a first electrode proximate to the flap; and
the actuator is configured to electrically charge the first electrode, thereby attracting the flap towards the first electrode and operating the valve into the open state.

21. The display of claim 20, wherein the actuator comprises a second electrode and the actuator is configured to electrically charge the second electrode, thereby attracting the flap towards the second electrode and operating the valve into the closed state.

22. The display of claim 20, wherein the flap is arranged over an opening of the channel and extends beyond at least one dimension of the opening such that the flap cannot pass through the opening.

23. The display of claim 20, wherein the valve comprises a third cavity comprising fluid and bounded at least in part by a dielectric elastomer, the dielectric elastomer comprising electrodes attached to opposing sides of a third elastomer;
wherein the third cavity is arranged proximate to an opening of the channel; and
wherein applying a first electric potential across the electrodes attached to the third elastomer alters the third elastomers shape and causes the third cavity to allow fluid to flow through the opening of the channel.

24. The display of claim 23, wherein applying a second electric potential across the electrodes attached to the third elastomer, the second electric potential being lower than the first electric potential, causes the third cavity to block fluid from flowing through the opening of the channel.

25. The display of claim 23, wherein maintaining the second electric potential across the electrodes attached to the third elastomer requires no power.

* * * * *